(12) United States Patent
Bartek

(10) Patent No.: US 6,761,157 B2
(45) Date of Patent: Jul. 13, 2004

(54) PNEUMATIC MATERIAL DELIVERY GUN WITH REMOVABLE MATERIAL CARTRIDGE

(76) Inventor: Edward J. Bartek, 26 C St., Middlesex, NJ (US) 08846

( * ) Notice: Subject to any disclaimer, the term of this patent is extended or adjusted under 35 U.S.C. 154(b) by 0 days.

(21) Appl. No.: 10/329,641

(22) Filed: Dec. 26, 2002

(65) Prior Publication Data

US 2003/0134566 A1 Jul. 17, 2003

Related U.S. Application Data

(60) Provisional application No. 60/343,807, filed on Dec. 28, 2001.

(51) Int. Cl.$^7$ .......................... F41B 11/00; A63H 33/30; A63H 5/00; A63H 33/40
(52) U.S. Cl. .......................... 124/56; 124/59; 446/475; 446/176; 446/181
(58) Field of Search .......................... 124/56, 71, 59; 446/475, 176, 181, 211, 180, 121; 406/38, 108, 122, 145, 146

(56) References Cited

U.S. PATENT DOCUMENTS

| | | | |
|---|---|---|---|
| 1,560,326 A | | 11/1925 | Rutherford |
| 2,746,807 A | * | 5/1956 | Tolman .......................... 406/89 |
| 2,784,038 A | * | 3/1957 | Schneider .................... 406/122 |
| 3,633,560 A | | 1/1972 | DeFreitas |
| 4,116,491 A | * | 9/1978 | Ply .............................. 406/89 |
| 4,249,839 A | * | 2/1981 | Vance .......................... 406/109 |
| 4,474,327 A | * | 10/1984 | Mattson et al. ............. 239/143 |
| 4,810,272 A | * | 3/1989 | Overby .......................... 55/420 |
| 4,863,104 A | * | 9/1989 | Masterson .................. 239/345 |
| 4,974,277 A | * | 12/1990 | Casella .......................... 15/3.5 |
| 5,015,211 A | | 5/1991 | Reveen |
| 5,149,290 A | | 9/1992 | Reveen |
| 5,226,567 A | * | 7/1993 | Sansalone .................... 222/195 |
| 5,288,024 A | * | 2/1994 | Vitale .......................... 239/346 |
| 5,329,660 A | * | 7/1994 | Fowler .......................... 15/3.5 |
| 5,403,225 A | | 4/1995 | Watkins |
| 5,419,731 A | | 5/1995 | Watkins |
| 5,472,023 A | * | 12/1995 | Fogal et al. .................... 141/9 |
| 5,529,527 A | | 6/1996 | Watkins |
| 5,556,319 A | | 9/1996 | Watkins |
| 5,620,355 A | | 4/1997 | Watkins |
| 5,634,840 A | | 6/1997 | Watkins |
| 5,660,160 A | | 8/1997 | Prescott |
| 5,772,491 A | | 6/1998 | Watkins |
| 5,797,304 A | | 8/1998 | Sterr |
| 5,911,805 A | | 6/1999 | Sterr |
| 6,010,082 A | * | 1/2000 | Peterson ...................... 239/346 |
| 6,149,495 A | | 11/2000 | Austin et al. |
| 6,190,045 B1 | * | 2/2001 | Schulman ..................... 383/24 |
| 6,216,876 B1 | * | 4/2001 | Quillian, III ................. 209/138 |
| 2002/0077027 A1 | | 6/2002 | Wu |
| 2003/0164387 A1 | * | 9/2003 | Grach et al. |

OTHER PUBLICATIONS

Cannon Line, Stage Mortar, http://web.archive.org/web/19991128084755/http://www.aerotechnic.com/cannon5.htm.*
Cannon Line, , Streamer, http://web.archive.org/web/20000623023937/http://www.aerotechnic.com/cannon1.htm.*
www.capsu.org, Notes, 5 pages.
Edward J. Bartek, Enter the Realm of Aerotechnics, Fall, 2001 Catalog #21, 32 pages, Special F/X, Inc., So. Bound Brook, New Jersey.

* cited by examiner

*Primary Examiner*—Derris H. Banks
*Assistant Examiner*—Faye Francis
(74) *Attorney, Agent, or Firm*—Mathews, Collins, Shepherd & McKay, P.A.

(57) ABSTRACT

A pneumatic material delivery gun with removable material cartridge attached (100) is used with a high-pressure air source (not shown) which is coupled to mechanical fitting (202). The removable material cartridge (300) can be easily and rapidly attached and detached to the pneumatic material delivery gun (200) in only a few seconds.

20 Claims, 4 Drawing Sheets

PNEUMATIC MATERIAL DELIVERY GUN WITH REMOVABLE MATERIAL CARTRIDGE

CROSS REFERENCES TO RELATED APPLICATIONS

This application claims the benefit under 35 U.S.C. 119(e) of U.S. Provisional Application Serial No. 60/343,807, entitled Pneumatic Material Delivery Gun With Removable Material Cartridge, filed on Dec. 28, 2001.

FIELD OF INVENTION

The present invention relates generally to a pneumatic device and more particularly to a pneumatic device for delivering a variety of material through the air.

BACKGROUND OF THE INVENTION

Aerotechnics effects should not be confused with pyrotechnics. By utilizing compressed air, CO2 gas, or other suitable compressed gas, a dazzling display of safe, non-pyrotechnic novelty effects resembling colorful fireworks, but without the danger is delivered. Typically devices use disposable CO2 cartridges as the propellant and are triggered manually or electrically. However, some advanced models work with high volume air and produce high power/volume results.

Aerotechnics effects are widely used at grand opening events, corporate presentations, trade shows, weddings, children's parties, and magic productions by celebrities, touring groups, rock bands, political campaigns, television specials, sporting events, stage shows, movies, casinos, theme parks, churches and cruise lines. Delivery of t-shirts, promotional items such as hats, and food items is becoming popular at sporting events and concerts.

Traditionally, the aerotechnics unit (gun) is barrel loaded. Additionally, extra inter-changeable barrels provide the ability switch empty barrels with loaded barrels. The barrel must be constructed of a strong material, as the barrel must withstand the pneumatic pressure in order to eject the material. In order to rapidly delivery material from a single aerotechnics gun, it would be necessary to have a large number of preloaded interchangeable barrels or have a material that can be rapidly loaded into the barrel.

There is a need to be able to rapidly deliver a variety of user interchangeably selectable material which does not require removal of the barrel of an aerotechnics gun.

SUMMARY OF THE INVENTION

The present invention is a pneumatic material delivery gun with removable material cartridge, a pneumatic material delivery gun, and a removable material cartridge.

BRIEF DESCRIPTION OF THE DRAWINGS

A more complete understanding of the present invention may be obtained from consideration of the following description in conjunction with the drawings in which.

DETAILED DESCRIPTION OF VARIOUS ILLUSTRATIVE EMBODIMENTS

Figure 1:
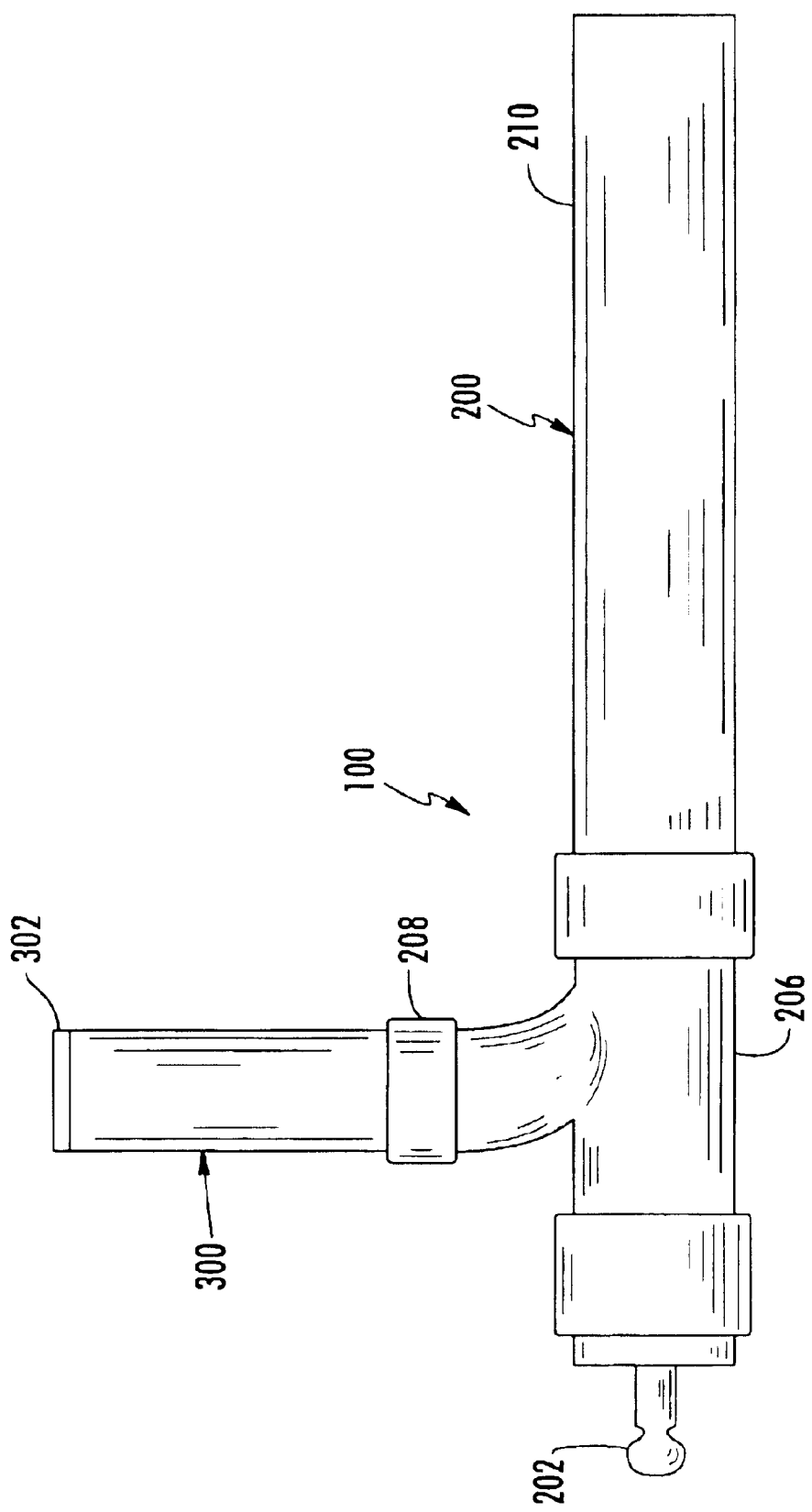
FIG. 1 is a drawing of a removable material cartridge attached to a pneumatic material delivery gun with the device inverted.

Referring to FIG. 1 there can be seen a diagram of a pneumatic material delivery gun with removable material cartridge installed. The removable material cartridge can be loaded (or preloaded) with a variety of material including clothing such as of t-shirts and hats, promotional items, food items, as well as confetti, streamers, mylar material, confetti flakes of various sizes and shapes as well as other suitable material such as coupons, etc.

Figure 3B:
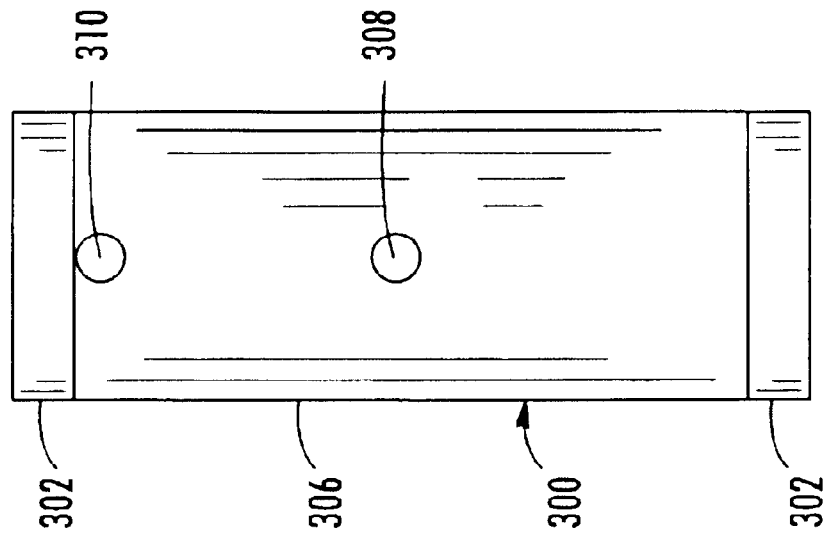
FIGS. 3a and b are drawings of two embodiments of the removable material cartridge; and, FIGS. 4a and 4b are drawings of two embodiments of a multiple cartridge assembly.

The removable material cartridge shown FIG. 3b is a two shot cartridge, with a first discharge of part of the material occurring when the device is positioned with the pneumatic material delivery gun having the removable material cartridge below. A second discharge of the remaining material occurs when the pneumatic material delivery gun is inverted so that the removable material cartridge is above the gun.

The removable material cartridge can be used with a pneumatic material delivery gun that is mounted. The mounted device can be triggered remotely and can optionally be remotely positioned to operate in the inverted and non-inverted position, through a wired interface, wireless control, or programmable controller.

The pneumatic material delivery gun can use a disposable cartridge made out of cardboard or clear plastic tubing with thin end caps paper or paper like material attached by glue, tape or other suitable means to hold the material within the tube prior to discharge. During use the end caps rupture (or are sucked off the cartridge) allowing the material to be discharged.

While the pneumatic material delivery gun is well suited to discharge shaped paper confetti it is equally well suited for use with a wide variety of material including clothing such as of t-shirts and hats, promotional items, food items, as well as confetti, streamers, mylar material, confetti flakes of various sizes and shapes as well as other suitable material such as coupons, etc. can be used. In some uses, the device may be used to discharge animal food, seeds, fertilizer and other materials, such as remote sensors etc.

The pneumatic material delivery gun can be used with a source of pressurized air worn, such as that provided is pressurized air tanks as well as with disposable pressurized cartridges.

Figure 2:
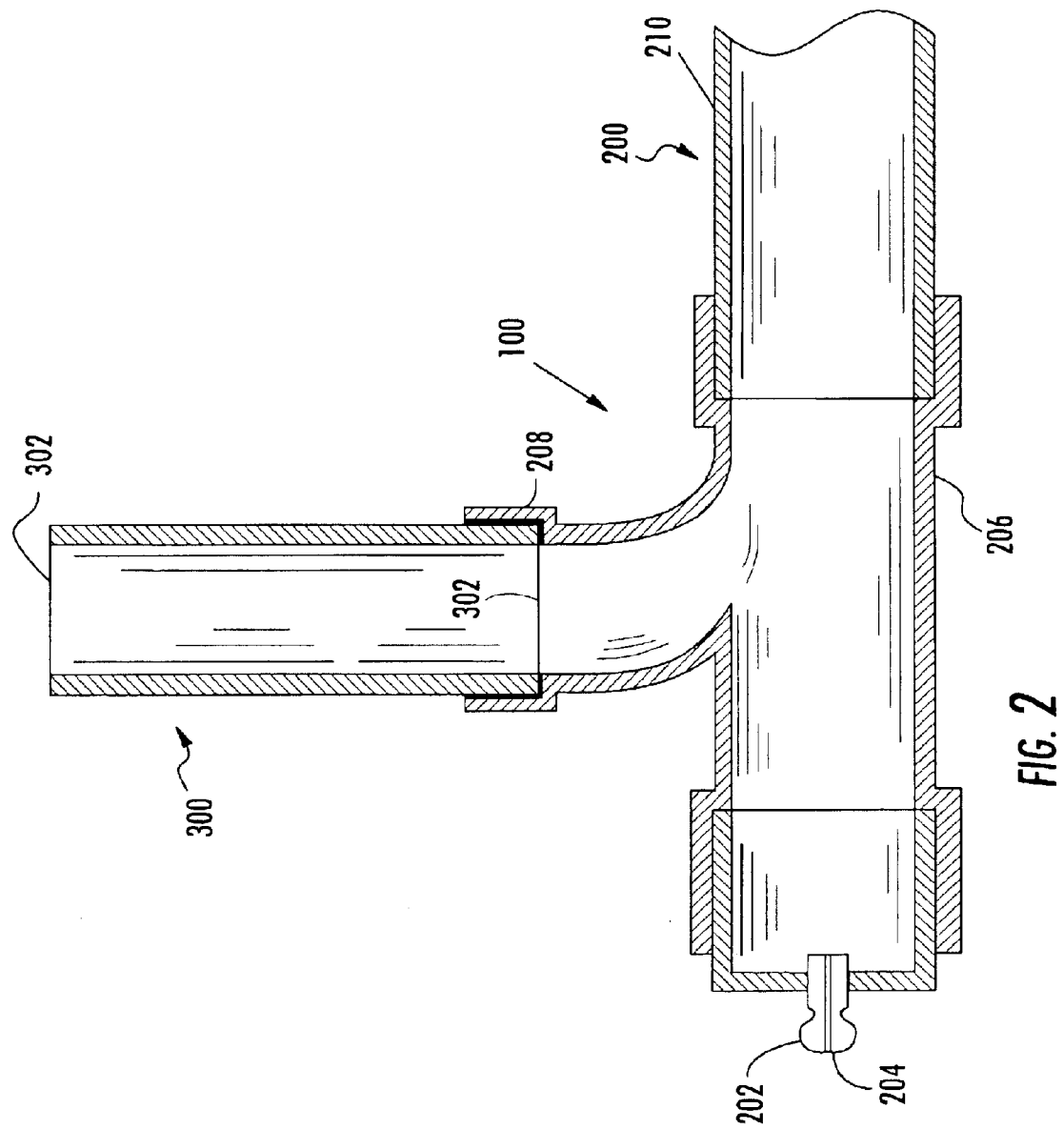
FIG. 2 is a partial cross sectional view of FIG. 2.

Referring to FIG. 1 there can be seen a drawing of the removable material cartridge attached to the pneumatic material delivery gun with the device inverted. Referring to FIG. 2 there can be seen a partial cross sectional view of FIG. 1. The present invention the pneumatic material delivery gun with removable material cartridge attached 100 is used with a high-pressure air source (not shown) which is coupled to mechanical fitting 202. The removable material cartridge 300 can be easily and rapidly attached and detached to the pneumatic material delivery gun 200 in only a few seconds.

When the pneumatic material delivery gun is operated, the high-pressure air passes through a channel 204 in the mechanical fitting 202 into a mixing tee 206. In the channel of the mixing tee 206 the high-pressure (compressed) air is increased in velocity and this high velocity air is injected into the interior of mixing tee 206. Within mixing tee 206, this high velocity air induces a low-pressure area in the interior of mixing tee 206. The material 304 which is placed in the removable material cartridge 300 is drawn through side inlet 208, by rupturing the thin end caps 302, and into the interior of mixing tee 206 wherein the compressed air from the channel 204 mixes with the material 304 (such as confetti) and the resulting mixture passes through discharge outlet tube 210 to provide pneumatic delivery of the material 304. In another embodiment, the channel 204 is replaced by a converging nozzle (not shown) which can be coupled to a high velocity high volume air source such as a blower. The velocity of compressed air in one embodiment passing through the converging nozzle is approximately 150 to 200 feet per second.

The use of smaller and larger diameter converging nozzles, mixing tees 206, side inlets 208, pickup tubes and outlet tubes 210 are contemplated by this invention. A minimum practical tube size of approximately 1" diameter is a function of the minimum size of confetti generally available, confetti approximately ¼ inch in size (either square or round) is available. The maximum tube size is limited only by the availability of large volumes of compressed air and the technical difficulty of handling extremely large volumes of material 304 such as confetti. Tube diameters in the 6 to 8 inch range are practical for very large material volume or size. With larger and smaller diameter outlet tubes approximately proportionate length to diameter ratios are contemplated and equally well suited from the 18 inches described herein. For a 1 inch tube the minimum lengths would be approximately 6 inches and the maximum length would be approximately 2 to 3 feet. For larger diameters such as 8 inch tube the minimum length of approximately 3 feet and maximum length of approximately 15 to 20 feet are contemplated. Based on the volume and pressure of the compressed air, adequate velocity is created within the interior of mixing tee 206 to create sufficient low pressure to draw the material 304 through inlet tube 208 and propel the material air mixture through outlet tube 210. The minimum velocity of compressed air through the channel 204 or converging nozzle should not be substantially below approximately 35 feet per second, higher velocities are limited primarily by the availability of a source of compressed air and the increased noise that accompanies compressed air velocities above those described for the preferred embodiment which distracts the audience and may otherwise annoy the spectators. The absolute upper limitation, of course, is the velocity of sound under the conditions in which the device is being used. The contemplated ratio of the inside diameter of converging nozzle tip to the inside diameter of mixing tee 206 is a range of approximately 0.05 to 0.5 (that is the inside diameter of converging nozzle tip 24 would be 5% to 50% of the inside diameter of mixing tee 206).

As previously noted, alternative embodiments can utilize an air delivery/mixing system which instead of a converging nozzle utilizes a small diameter opening (channel 204) at the end of the gun 200 wherein the air flow is controlled (released) by use of a pressure sprayer trigger (not shown). Additional systems may be used to provide the controlled release of the burst of air, and may be matched to the particular material being delivered.

Figure 3A:
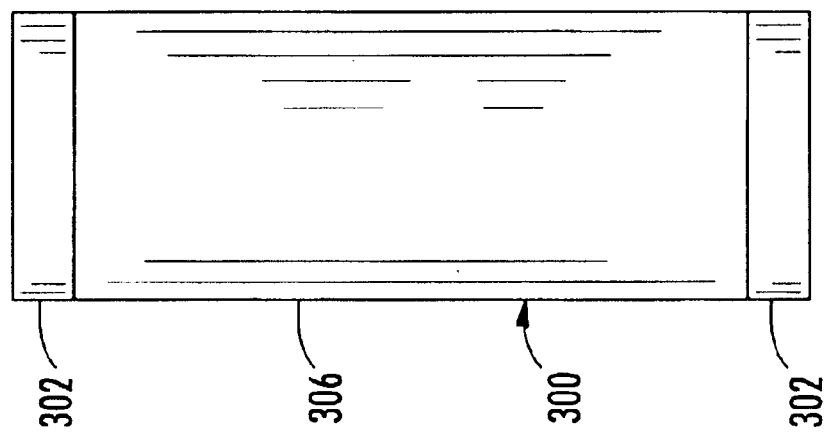

Referring to FIGS. 3a and 3b there can be seen drawings of two embodiments of the removable material cartridge 300. FIG. 3a shows the removable material cartridge having thin end caps 302 attached and a cardboard tube body 306. FIG. 3b shows the two shot removable material cartridge which is discharged first in the non inverted position and then in the inverted position, which is shown. Vent holes 308 and 310 are provided for a two shot cartridge. Mid vent hole 308 is located approximately half way along the length of the removable material cartridge 300 and end vent hole 310 is located approximately at the edge of the end cap 302.

While two vent holes are shown, typically four, six eight or more vent holes positioned approximately equal radial internals around the removable material cartridge 300 are used. A first discharge of part of the material 304 occurs when the pneumatic material delivery gun 200 is positioned with the removable material cartridge 300 below. When the pneumatic material delivery gun 200 is triggered approximately half of the material 304 is sucked up the tube 306 with air venting in through mid vent hole 308. A second discharge of the remaining material occurs when the pneumatic material delivery gun 200 is inverted so that the removable material cartridge 300 is above the gun. When the pneumatic material delivery gun 200 is triggered the remaining material 304 is sucked down the tube 306 with air venting in through end vent 310 and mid vent hole 308.

Figure 4B:
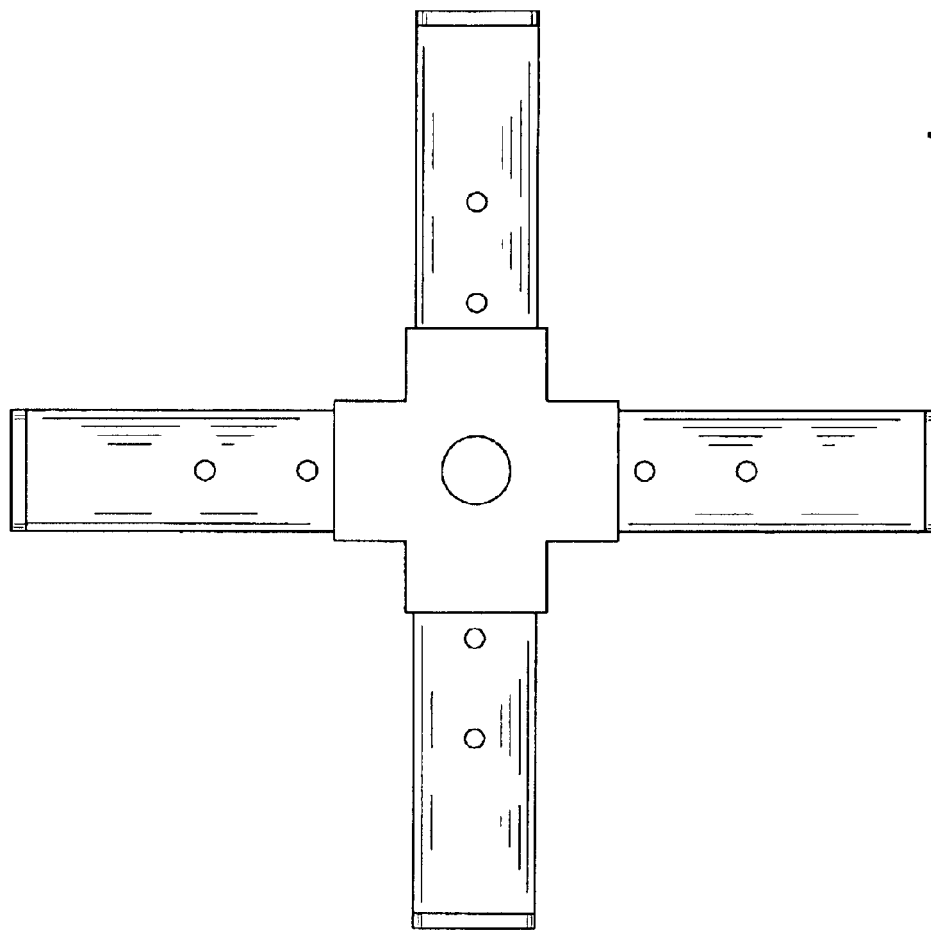
Figure 4A:
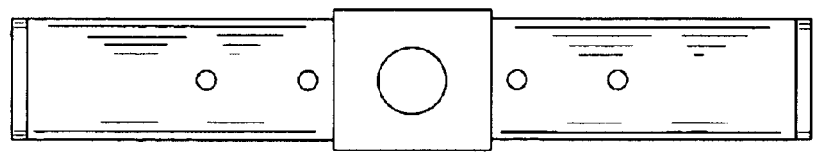

Referring to FIGS. 4a and 4b there can be seen drawings of two embodiments of multiple cartridges. While only two embodiments are shown, a large number of configurations, including placement of the cartridges in line as well as three-dimensional configurations are equally well suited. The multiple cartridge embodiment enables an operator to have four or more material discharges by first operating the pneumatic material delivery gun 200 with the removable material cartridge 300, operating the pneumatic material delivery gun 200 in an inverted position, and then repositioning the multiple cartridge so as to associate a different cartridge with the side inlet 208.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications, which come within the scope of the appended claims, is reserved.

I claim:

1. A device used with a source of compressed gas for delivering material through the air, the device comprising:
    an air cannon having a gas inlet adapted to couple to the source of compressed gas, a discharge outlet, a side material inlet, and a mixing T;
    a removable material cartridge for holding the material, the removable material cartridge having a first end and a second end at least one of the first end or the second end adapted to removably couple to the side material inlet, the removable material cartridge has vent holes to enable discharge of the material in a first sequence and a second sequence by inverting the air cannon with the removable material cartridge inserted, without removing the material cartridge;
    a first end cap substantially closing the first end of the removable material cartridge;
    a second end cap substantially closing the second end of the removable material cartridge;
    wherein operation of the air cannon by supplying compressed gas to the gas inlet creates a suction at the side material inlet causing the material to be sucked out of the removable material cartridge and discharged through the discharge outlet.

2. The device as recited in claim 1 wherein the removable material cartridge is cylindrical.

3. The device as recited in claim 1 wherein the side material inlet enters the mixing T at an angle greater than ninety degrees relative to the discharge outlet.

4. The device as recited in claim 1 wherein the side material inlet enters the mixing T through a radial bend angled towards the discharge outlet.

5. The device as recited in claim 1 wherein the removable material cartridge is reloadable.

6. The device as recited in claim 1 wherein the vent holes are located approximately at the mid point of the removable material cartridge and near one of the ends of the removable material cartridge.

7. The device as recited in claim 1 wherein the removable material cartridge body is substantially transparent so that the material is at least partially visible through the removable material cartridge body.

8. The device as recited in claim 1 wherein the removable material cartridge body is cardboard.

9. The device as recited in claim 1 wherein the removable material cartridge body is plastic.

10. A removable material cartridge for use with a pneumatic device, having a side material inlet, used with a source of compressed gas for delivering material through the air, the cartridge comprising:

a removable material cartridge body for holding the material, the removable material cartridge body having a first end and a second end wherein at least one of the first end or the second end adapted to removable couple to the side material inlet;

a first end cap of a paper material substantially closing the first end of the removable material cartridge;

a second end cap of a paper material substantially closing the second end of the removable material cartridge;

wherein operation of the pneumatic device by supplying compressed gas creates a suction at the side material inlet causing the material to be sucked out of the removable material cartridge body and discharged through the pneumatic device.

11. The cartridge as recited in claim 10 wherein the removable material cartridge body is cylindrical.

12. The cartridge as recited in claim 10 wherein the removable material cartridge is reloadable.

13. The cartridge as recited in claim 10 wherein the removable material cartridge is disposable.

14. The cartridge as recited in claim 10 wherein the removable material cartridge body is substantially transparent so that the material is at least partially visible through the removable material cartridge body.

15. The cartridge as recited claim 10 wherein the removable material cartridge body is cardboard.

16. The cartridge as recited in claim 10 wherein the removable material cartridge body is plastic.

17. A removable material cartridge for use with a pneumatic device having a side material inlet, used with a source of compressed gas for delivering material through the air, the cartridge comprising:

a removable material cartridge body for holding the material, the removable material cartridge body having a first end and a second end wherein at least one of the first end or the second end adapted to removable couple to the side material inlet, the removable material cartridge body has at least one vent hole to enable discharge of the material in a first sequence and a second sequence by inverting the pneumatic device with the removable material cartridge inserted, without removing the material cartridge;

a first end cap substantially closing the first end of the removable material cartridge;

a second end can substantially closing the second end of the removable material cartridge;

wherein operation of the pneumatic device by supplying compressed gas creates a suction at the side material inlet causing the material to be sucked out of the removable material cartridge body and discharged through the pneumatic device.

18. The cartridge as recited in claim 17 wherein the vent holes are located approximately at the mid point of the removable material cartridge body and near one of the ends of the removable material cartridge body.

19. The cartridge as recited in claim 17 further comprising a second removable material cartridge adapted to enable discharge of the material from the removable cartridge in a first sequence and a second sequence by inverting the pneumatic gun device with without removing the removable material cartridge and then by coupling the second removable material cartridge to the side material inlet the second material cartridge is enabled discharge the material from the second removable cartridge in a first sequence and a second sequence by inverting the pneumatic gun with without removing the second removable material cartridge.

20. The cartridge as recited in claim 17 wherein the removable material cartridge body is substantially transparent so that the material is at least partially visible through the removable material cartridge body.

* * * * *